No. 687,381. Patented Nov. 26, 1901.
S. A. McCULLOUGH.
FISH HOOK.
(Application filed Apr. 16, 1901.)
(No Model.)

Witnesses:
Joseph Rizzolo
Robt. Craw

Inventor:
Samuel A. McCullough,
by his attorney,
Charles R. Searle.

THE NORRIS PETERS CO., PHOTO-LITHO., WASHINGTON, D. C.

UNITED STATES PATENT OFFICE.

SAMUEL A. McCULLOUGH, OF NEW YORK, N. Y.

FISH-HOOK.

SPECIFICATION forming part of Letters Patent No. 687,381, dated November 26, 1901.

Application filed April 16, 1901. Serial No. 56,054. (No model.)

*To all whom it may concern:*

Be it known that I, SAMUEL A. MCCULLOUGH, a subject of the King of Great Britain, residing in the city of New York, borough of Manhattan, in the county and State of New York, have invented a certain new and useful Improvement in Fish-Hooks, of which the following is a specification.

The object of the invention is to provide a construction in which the fish when hooked will be less likely to escape.

I arrange two hooks with their points facing each other and their shanks looped together in such manner that one may slide upon the other. At one extreme of this sliding movement the hooks are widely separated and when thus conditioned one of the hooks is baited. A pull by a fish on the baited hook is sufficient to overcome the slight resistance offered and the resulting movement brings both hooks into such relation that both grasp the fish, as will be hereinafter more fully described.

The accompanying drawings form a part of this specification and show the invention as I have carried it out.

Figure 1:
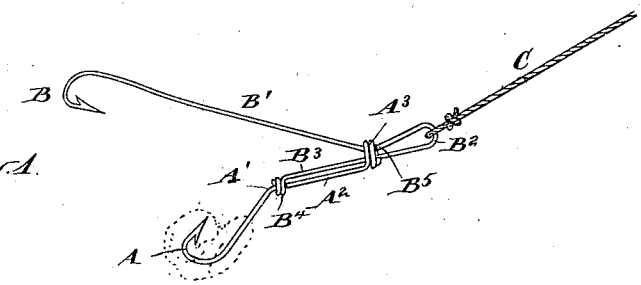
Figure 2:
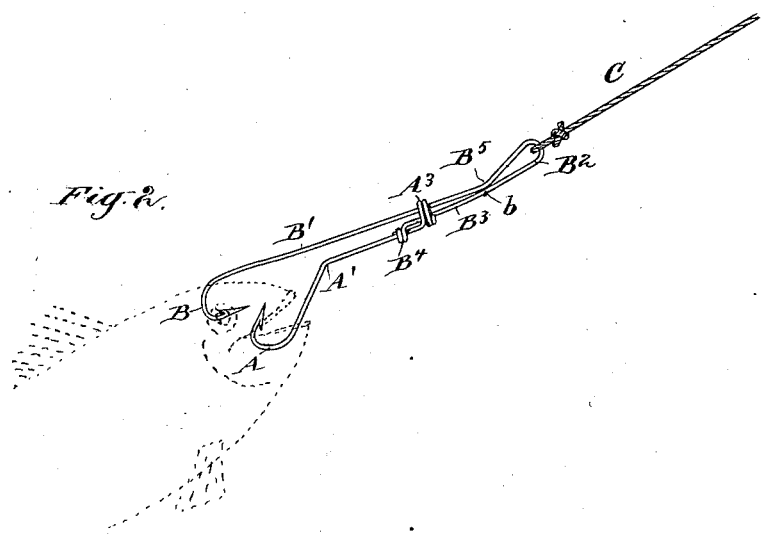
Figure 3:
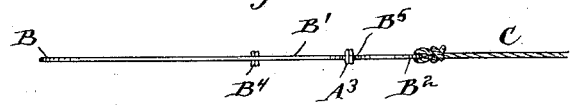

Figure 1 is a side view showing the device in the open condition, and Fig. 2 is a corresponding view showing the position assumed by the parts in action. Fig. 3 is an edge view corresponding to Fig. 1.

Similar letters of reference indicate the same parts in all the figures.

The hook A, which I will for convenience in describing term the "bait-hook," has its shank bent at an obtuse angle at $A'$, and thence extends rearwardly in a straight portion $A^2$, terminating in an eye $A^3$. The other hook B, which I will term the "gaff-hook," has its shank bent to an approximately V form, with one arm longer than the other, and the bight or angle passes through the eye $A^3$. The spring of the wire tends to keep the arms separated, and any movement of the eye $A^3$ along the arms in the direction of the hook B tends to draw the arms together, as will be readily understood. The long straight portion of the shank carrying the gaff-hook is marked $B'$, the bend is marked $B^2$, and the short arm $B^3$. The latter is looped at its end at $B^4$ about the straight portion $A^2$ of the bait-hook shank, and thus holds and guides it. A slight bend or angle $B^5$ is produced in the shank or arm $B'$ at a point near the bend $B^2$, and when the hooks are in the separated condition is lightly engaged by the eye $A^3$ and offers a slight easily-yielding resistance to the sliding movement.

Both hooks and their shanks lie in the same plane, as indicated in Fig. 3. The line C is attached to the bend $B^2$ and holds the gaff-hook and its parts relatively stationary.

The operation is as follows: The shank of the hook A is slid rearwardly upon the arms $B'$ $B^3$ until the angle $B^5$ is engaged in the loop or eye $A^3$ and the hooks lie separated, as in Fig. 1, with the bait on the short hook A. A sufficient pull by a fish attacking the bait-hook overcomes the slight resistance offered by the engagement of the bend $B^5$ and eye $A^3$ and draws the latter forward, thus causing the arms $B'$ $B^3$ to assume a more nearly parallel position until, if the pull be continued, the gaff-hook and bait-hook approach so nearly, as shown in Fig. 2, that a fish on the bait-hook will be caught also by the gaff-hook and the chance of escape greatly lessened.

It will be observed that the lines of movement of the barbed points of both hooks are such as to present the gaff-hook most favorably for engagement and also that when the arms of the gaff-hook are nearly parallel, as in Fig. 2, they are securely held by the eye $A^3$, so that the hooks can be separated again only by again sliding the eye rearwardly upon the arms. When in the closed condition, the device is further stiffened by the pressure of the angle $B^5$ against the arm $B^3$, as indicated at $b$ in Fig. 2, and also by reason of the fact that when in this position the free portion of the arm $B'$ is considerably reduced in length.

The type of hook used and the sizes and proportions of the parts may be varied as conditions or individual preferences may decide.

Both hooks may be baited, if preferred. The gaff-hook in such case serves also as an ordinary hook in addition to the above-described function.

I claim—

1. A bait-hook and its shank, and eye thereon, in combination with a gaff-hook having its shank bent to form two divergent arms inclosed in said eye, a loop on one of said arms encircling said bait-hook shank, the latter arranged to slide relatively to said arms and by the movement of said eye cause the arms to approach and separate and thereby correspondingly move said hooks to and from each other, all substantially as herein specified.

2. A bait-hook and its shank, and eye thereon, in combination with a gaff-hook having its shank bent to form two divergent arms inclosed in said eye, a loop on one of said arms encircling said bait-hook shank, the latter arranged to slide upon said arms and by such movement of said eye to cause the arms to approach and separate and thereby correspondingly move said hooks toward and from each other, and means for yieldingly holding said arms in the separated condition, all substantially as and for the purposes herein specified.

3. The bait-hook A, shank $A^2$ and eye $A^3$ thereon, in combination with the gaff-hook B arm $B'$ thereon, bend $B^2$ and arm $B^3$ having the loop $B^4$ encircling said shank, the said arms inclosed in said eye, the latter and its shank free to slide thereon and thereby cause said hooks to approach and separate, all arranged to serve substantially as and for the purpose specified.

4. The bait-hook A, shank $A^2$ and eye $A^3$ thereon, in combination with the gaff-hook B, arm $B'$ thereon, bend $B^2$ and arm $B^3$ having the loop $B^4$ encircling said shank, the said arms inclosed in said eye, the latter and its shank free to slide thereon and thereby cause said hooks to approach and separate, and the angle $B^5$ in said arm $B'$ adapted to engage said eye and yieldingly hold said hooks in the separated condition, all arranged to serve substantially as and for the purposes herein specified.

In testimony that I claim the invention above set forth I affix my signature in presence of two witnesses.

SAMUEL A. McCULLOUGH.

Witnesses:
ROBT. CONNOR,
CHARLES R. SEARLE.